(12) United States Patent
Darthenay et al.

(10) Patent No.: US 12,500,619 B2
(45) Date of Patent: Dec. 16, 2025

(54) BASEBAND RECEIVER CIRCUIT

(71) Applicant: NXP B.V., Eindhoven (NL)

(72) Inventors: Frederic Darthenay, Luc sur Mer (FR); Khurram Waheed, Austin, TX (US)

(73) Assignee: NXP B.V., Eindhoven (NL)

( * ) Notice: Subject to any disclaimer, the term of this patent is extended or adjusted under 35 U.S.C. 154(b) by 662 days.

(21) Appl. No.: 17/823,591

(22) Filed: Aug. 31, 2022

(65) Prior Publication Data

US 2023/0091838 A1    Mar. 23, 2023

(30) Foreign Application Priority Data

Sep. 17, 2021  (EP) ..................................... 21306286

(51) Int. Cl.
  *H04B 1/16*  (2006.01)
  *H04B 1/00*  (2006.01)
  *H04B 1/18*  (2006.01)
  *H04L 27/38*  (2006.01)

(52) U.S. Cl.
  CPC ............. *H04B 1/18* (2013.01); *H04B 1/0028* (2013.01); *H04L 27/38* (2013.01); *H04L 27/3827* (2013.01)

(58) Field of Classification Search
  CPC ............... H04W 88/00–06; H04B 1/10; H04B 1/1027–109; H03H 19/004
  See application file for complete search history.

(56) References Cited

U.S. PATENT DOCUMENTS

| | | | |
|---|---|---|---|
| 7,057,540 B2 | 6/2006 | Muhammad et al. | |
| 7,411,444 B2 | 8/2008 | Muhammad et al. | |
| 8,570,100 B2 | 10/2013 | Morishita et al. | |
| 9,093,982 B2 | 7/2015 | Morishita et al. | |
| 9,318,999 B2 | 4/2016 | Morishita | |
| 10,056,881 B2 | 8/2018 | Madadi et al. | |
| 2010/0167685 A1* | 7/2010 | Burke ...................... | H04B 1/28 455/341 |
| 2010/0264751 A1 | 10/2010 | Iida et al. | |
| 2011/0040818 A1* | 2/2011 | Fagg .................... | H03H 19/004 708/313 |
| 2014/0194081 A1 | 7/2014 | Tohidian et al. | |

(Continued)

OTHER PUBLICATIONS

Bozorg, Amir et al., "A Charge-Rotating IIR Filter with Linear Interpolation and High Stop-Band Rejection", 47th European Solid State Circuits Conference, Sep. 13, 2021, pp. 335-338, IEEE, Piscataway, NJ, USA.

(Continued)

*Primary Examiner* — San Htun

(57) ABSTRACT

A receiver path circuit includes a first stage, a down-sampler and a second stage. The first stage is configured to filter a mixer-output-signal received from a mixer and provide a first-stage-output-signal. The down-sampler is configured to down-sample the first-stage-output-signal to provide a transition-signal having a transition-frequency. The transition-frequency is lower than the frequency of the first-stage-output-signal. The second stage includes a switched-capacitor circuit that is configured to filter and reduce the frequency of the transition-signal in order to provide a second-stage-output-signal to an ADC.

17 Claims, 12 Drawing Sheets

(56) References Cited

U.S. PATENT DOCUMENTS

| | | | | |
|---|---|---|---|---|
| 2014/0354376 | A1* | 12/2014 | Madadi | H04B 1/16 |
| | | | | 333/166 |
| 2015/0280660 | A1* | 10/2015 | Azin | H03F 3/45183 |
| | | | | 330/260 |
| 2015/0333712 | A1* | 11/2015 | Deliwala | G01R 27/2605 |
| | | | | 324/123 R |
| 2018/0351593 | A1* | 12/2018 | Harwalkar | H03F 3/45475 |
| 2019/0007088 | A1 | 1/2019 | Kuo et al. | |

OTHER PUBLICATIONS

Tohidian et al.: "Analysis and Design of a High-Order Discrete-Time Passive IIR Low-Pass Filter", IEEE Journal of Solid-State Circuits, vol. 49, No. 11, Nov. 2014, pp. 1-13.

Tohidian, Massoud et al., "A Fully Integrated Discrete-Time Superheterodyne Receiver", IEEE Transactions on Very Large Scale Integration (VLSI), Feb. 1, 2017, pp. 635-647, vol. 25, No. 2, IEEE, Piscataway, NJ, USA.

\* cited by examiner

BASEBAND RECEIVER CIRCUIT

CROSS-REFERENCE TO RELATED APPLICATIONS

This application claims the priority under 35 U.S.C. § 119 of European Patent application no. 21306286.2, filed on 17 Sep. 2021, the contents of which are incorporated by reference herein.

FIELD

The present disclosure relates to receiver circuits that have a first stage and a second stage, wherein the second stage includes a switched-capacitor circuit.

SUMMARY

According to a first aspect of the present disclosure there is provided a receiver path circuit comprising:
  a first stage configured to:
    filter a mixer-output-signal received from a mixer; and
    provide a first-stage-output-signal;
  a down-sampler configured to:
    down-sample the first-stage-output-signal to provide a transition-signal having a transition-frequency, wherein the transition-frequency is a lower than the frequency of the first-stage-output-signal;
  a second stage, which comprises a switched-capacitor circuit that is configured to:
    filter and reduce the frequency of the transition-signal in order to provide a second-stage-output-signal to an ADC.

Advantageously, use of the two stages can result in a relatively low power consumption. Furthermore, the second-stage-output-signal has a relatively low frequency that still enables acceptable performance of the downstream ADC without the ADC consuming a relatively large amount of power that would be required for a higher frequency signal.

In one or more embodiments. the first stage comprises a passive filter.

In one or more embodiments, the receiver path circuit further comprises a first-stage down-sampling filter that is configured to provide the functionality of the first stage and the down-sampler.

In one or more embodiments, the first-stage down-sampling filter comprises a first-stage switched capacitor circuit.

In one or more embodiments, the first-stage down-sampling filter is clocked by a signal from a local oscillator that is also used by the mixer.

In one or more embodiments, the first-stage switched capacitor circuit comprises a rotating capacitor IIR filter.

In one or more embodiments, the switched-capacitor circuit of the second stage comprises a weighted tapped sampling filter.

In one or more embodiments, the switched-capacitor circuit of the second stage is configured to be clocked at the transition-frequency.

In one or more embodiments, the first-stage down-sampling filter comprises:
  a first-stage-input-node for receiving the mixer-output-signal;
  a first-stage-intermediate-node;
  a first-stage-output-node for providing the transition-signal;
  a sampling-capacitor;
  an input-capacitor;
  an output-capacitor;
  an intermediate-capacitor; and
  a first-stage-switch having a switch-node.

The input-capacitor can be connected between the first-stage-input-node and ground. The sampling-capacitor can be connected between the switch-node of the first-stage-switch and ground. The intermediate-capacitor can be connected between the first-stage-intermediate-node and ground. The output-capacitor can be connected between the first-stage-output-node and ground. The first-stage-switch can be operable to connect the switch-node to each of the first-stage-input-node, the first-stage-intermediate-node and the first-stage-output-node in turn, over a sampling period.

In one or more embodiments, the sampling period corresponds to a period of a local oscillator that provides a clock signal to the mixer.

In one or more embodiments, the receiver path further comprises a first-stage-reset-node that is connected to ground, and wherein:
  the first-stage-switch is operable to connect the switch-node to each of the first-stage-input-node, the first-stage-intermediate-node, the first-stage-reset-node and the first-stage-output-node in turn, over the sampling period.

In one or more embodiments, the second stage comprises: a second-stage-input-node for receiving the transition-signal; a second-stage-output-node for providing the second-stage-output-signal; and one or more banks of capacitors. Each bank of capacitors may comprise a plurality of branches that are connected in parallel with each other between the second-stage-input-node and the second-stage-output-node.

Each branch may comprise:
  a second-stage-intermediate-node;
  a second-stage-capacitor connected between the second-stage-intermediate-node and ground;
  a second-stage-holding-switch connected between the second-stage-input-node and the second-stage-intermediate-node; and
  a second-stage-discharge-switch connected between the second-stage-intermediate-node and the second-stage-output-node.

The second-stage-holding-switches of each of the branches may be operable to selectively connect the second-stage-input-node to a respective one of the second-stage-capacitors sequentially in turn as part of a second stage sampling mode of operation. The second-stage-discharge-switches of each of the branches can be operable to selectively connect the second-stage-capacitors of each of the branches to the second-stage-output-node at the same time as part of a second stage discharging mode of operation. The second-stage-holding-switches and the second-stage-discharge-switches can be operated to perform the second stage discharging mode of operation and the second stage sampling mode of operation sequentially in turn.

In one or more embodiments, the receiver path circuit comprises a plurality of banks of capacitors in parallel with each other.

There is also disclosed a composite baseband filter comprising in-phase and quadrature processing paths, each of which includes two complementary processing paths, wherein each processing path comprises any of the receiver path circuits disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Typical baseband architectures in receivers can be composed of continuous time analogue filtering that provides enough anti-aliasing before entering the signal to a data converter. Such continuous time filters can be built around analogue components (resistors and capacitors) that can be typically trimmed and whose native values deviate with temperature once calibrated. This variation necessitates in some receiver circuits the need for periodic calibration, that requires fine trim resolution, to track value deviations that may occur with process, voltage and temperature, etc. Also, as technology nodes scale down, the dynamic range to process analogue signals has drastically reduced making legacy implementations more difficult to port to finer technology modes. Looking to specific function (localization) for Internet of Things (IoT), the spread of group delay and its deviation with temperature become hard to maintain under control.

Figure 1:
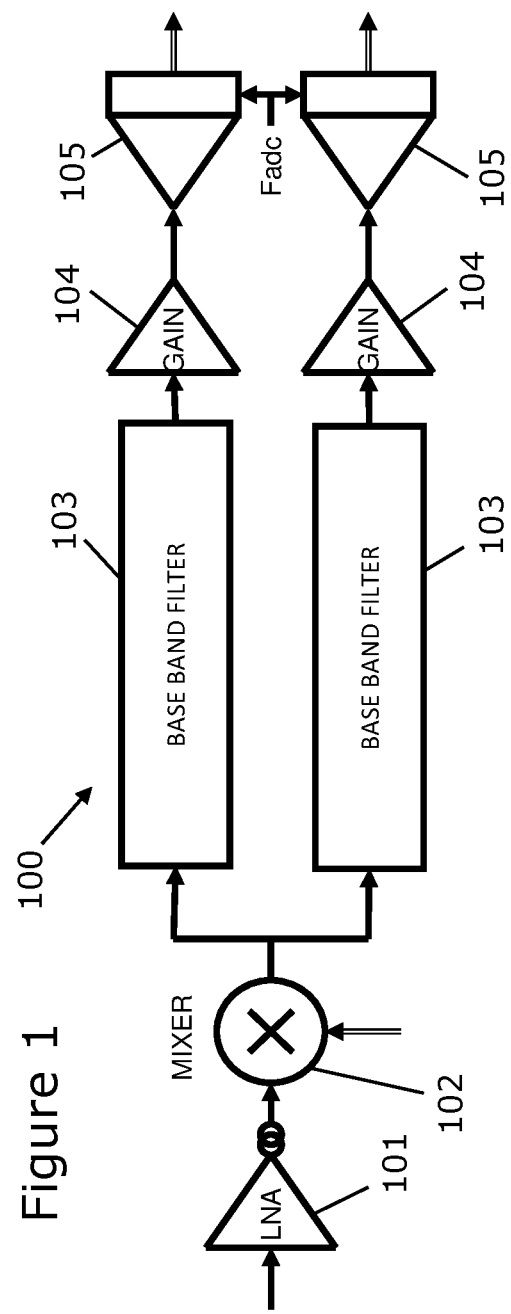
FIG. 1 shows a receiver (RX) chain including a RX baseband.

FIG. 1 shows a receiver (RX) chain 100 with a RX baseband. The down-converted signal after the low noise amplifier (LNA) 101 and mixer 102 is filtered by an analog baseband filter 103, which is shown to be in series with a baseband gain control stage 104. The outputs of the baseband gain control stage 104 are provided to analogue to digital converters (ADCs) 105, which are clocked at ant ADC clocking frequency (Fadc). The type, order and bandwidth (BW) of the baseband filter 103 are application dependent. RX structures such as those shown in FIG. 1 can be implemented in one of many possible ways, either in voltage or current domain, using single-ended or differential implementations, employing a combination of active or passive circuit elements, etc. Furthermore, the implemented baseband filter 103 can comprise real or complex poles.

Figure 2:
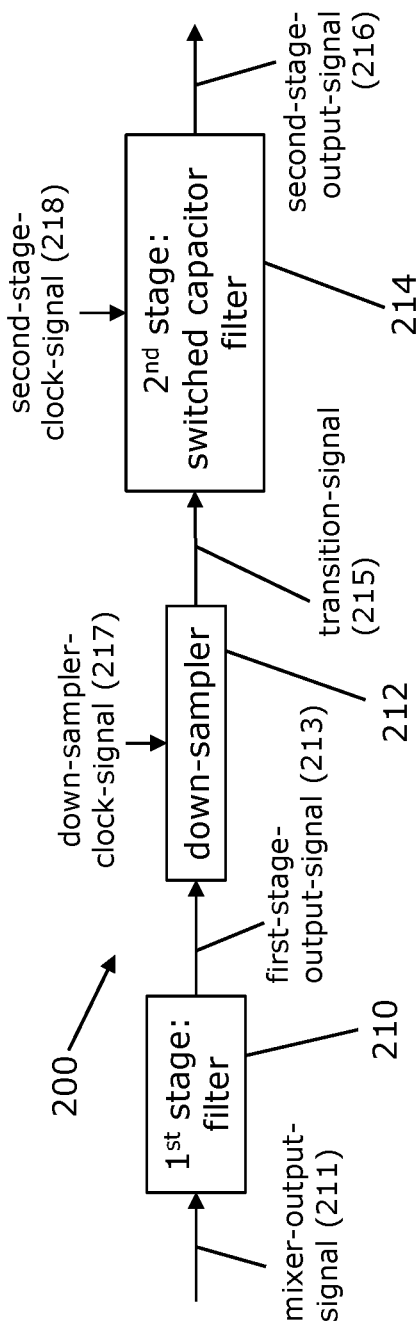
FIG. 2 shows an example embodiment of a receiver circuit.

FIG. 2 shows an example embodiment of a receiver circuit 200. The receiver circuit 200 includes a first stage 210, a down-sampler 212 and a second stage 214. In this example, the down-sampler 212 is illustrated as separate from the first stage 210 and the second stage 214. In other examples, as will be described below, the functionality of the down-sampler 212 can be provided as part of the first stage 210 or the second stage 214.

The first stage 210 filters a received mixer-output-signal 211 in order to provide a first-stage-output-signal 213. The mixer-output-signal 211 can be provided by a mixer such as the one illustrated in FIG. 1. The first stage 210 can be configured such that it reduces undesirable aliasing effects at harmonics of a transition-frequency (which will be discussed below). The filter of the first stage 210 comprises a passive filter, which can assist with lowering the power consumption of the first stage 210. The filter of the first stage 210 in this example is a continuous time filter, although as will be discussed below in other examples it can be a discrete time filter.

The down-sampler 212 down-samples the first-stage-output-signal 213 to provide a transition-signal 215, which has a transition-frequency. The transition-frequency is lower than the frequency of the first-stage-output-signal. For instance, if the frequency of the first-stage-output-signal is 2.4 GHz, the transition-frequency can be 600 MHz. In this example, the down-sampler 212 is clocked by a down-sampler-clock-signal 217 that is provided by a local oscillator (LO), which is also used to provide a clock signal for the mixer. Advantageously, this can mean that the down-sampler 212 does not require any separate high-rate clocks in addition to the output of the LO that is already available from the mixer. As proposed, all clock signals are isochroous with the LO. Therefore, the frequency of the down-sampler-clock-signal 217 can also be 2.4 GHz.

The second stage 214 comprises a switched-capacitor circuit. A switched-capacitor circuit uses switches to selectively charge and discharge one or more capacitors, as is known in the art. The switches are controlled such that the charge transfer is well-defined and deterministic. The switched-capacitor circuit of the second stage 214 filters, and reduces the frequency of, the transition-signal 215 in order to provide a second-stage-output-signal 216 for an ADC. As discussed below there may be one or more components in between the second stage 214 and the ADC. The second-stage-output-signal 216 has a frequency that is suitable for the downstream ADC. To continue the numerical example from above, the frequency of the second-stage-output-signal 216 may be the nearest matched to the sampling clock of the data path ADC in MHz. In this example, the second stage 214 is clocked by a second-stage-clock-signal 218 that has a frequency that is lower than that of the down-sampler-clock-signal 217. For instance, the second-stage-clock-signal 218 can have a frequency that is an integer division of the frequency of the down-sampler-clock-signal 217. In this numerical example, the frequency of the second-stage-clock-signal 218 is 600 Mhz (the same as the transition-frequency) and the frequency of the down-sampler-clock-signal 217 is 2.4 GHz.

Advantageously, use of the two stages in the receiver circuit 200 of FIG. 2 can result in a relatively low power consumption. Furthermore, the second-stage-output-signal 216 has a relatively low frequency that still enables acceptable performance of the downstream ADC without the ADC consuming a relatively large amount of power that would be required for a higher frequency signal.

In this way, examples disclosed herein can provide a novel RX baseband architecture (that is especially useful for IoT) that include switched capacitor circuits. Two different anti-aliasing stages can be combined in order to enable a low-power low-sampling rate ADC.

Figure 3:
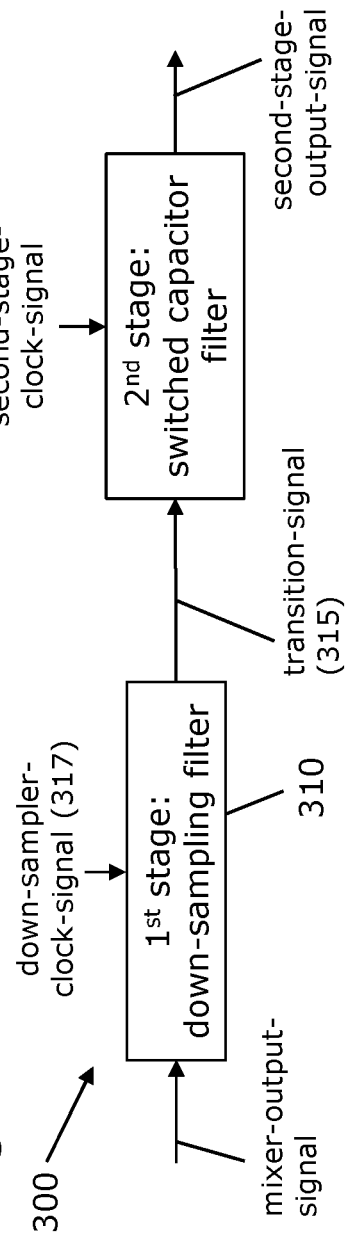
FIG. 3 shows another example embodiment of a receiver circuit.

FIG. 3 shows another example embodiment of a receiver circuit 300. Features of the receiver circuit 300 of FIG. 3 that are also shown in FIG. 2 are given corresponding reference numbers in the 300 series and will not necessarily be described again here.

In FIG. 3, the functionality of the down-sampler of FIG. 2 has been incorporated into the first stage 310 of FIG. 3. In this example, the first stage 310 comprises a first-stage down-sampling filter that provides the filtering functionality of the first stage of FIG. 2 and also the functionality of the down-sampler if FIG. 2. One way that such a first-stage down-sampling filter can be implemented is a switched-capacitor circuit, as will be described in detail with reference to FIG. 6 in particular.

The first-stage down-sampling filter of the first stage 310 in this example is clocked by a down-sampler-clock-signal 317 that is provided by a LO, and therefore has a LO frequency that is also used by the mixer (not shown). The output of the first stage 310 in FIG. 3 is the transition-signal 315. That is, the transition-signal 315 can also be considered as a first-stage-output-signal in this example.

Figure 4:
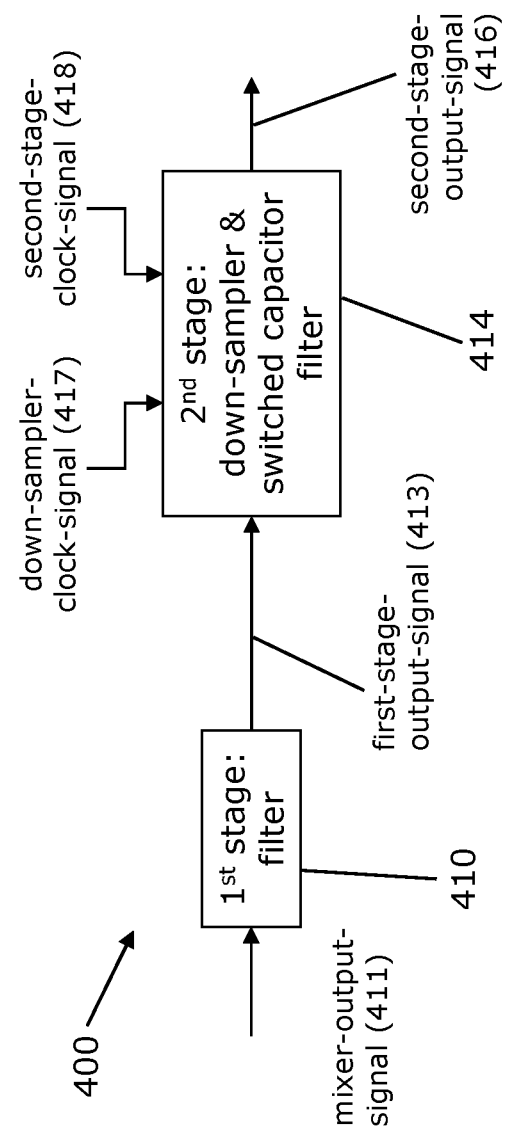
FIG. 4 shows a yet further example embodiment of a receiver circuit.

FIG. 4 shows another example embodiment of a receiver circuit 400. Features of the receiver circuit 400 of FIG. 4 that are also shown in FIG. 2 or FIG. 3 are given corresponding reference numbers in the 400 series and will not necessarily be described again here. This includes a first stage 410, which receives a received mixer-output-signal 411.

In FIG. 4, the functionality of the down-sampler of FIG. 2 has been incorporated into the second stage 414 of FIG. 4. In this example, the second stage 414 receives the down-sampler-clock-signal 417 in order to down-sample the first-stage-output-signal 413 to provide the transition-signal (not shown in FIG. 4 because it is internal to the second stage 414) having a transition-frequency. The second stage also receives the second-stage-clock-signal 418 in order to filter and reduce the frequency of the transition-signal to provide the second-stage-output-signal 416 in the same way as FIG. 2.

Figure 5:
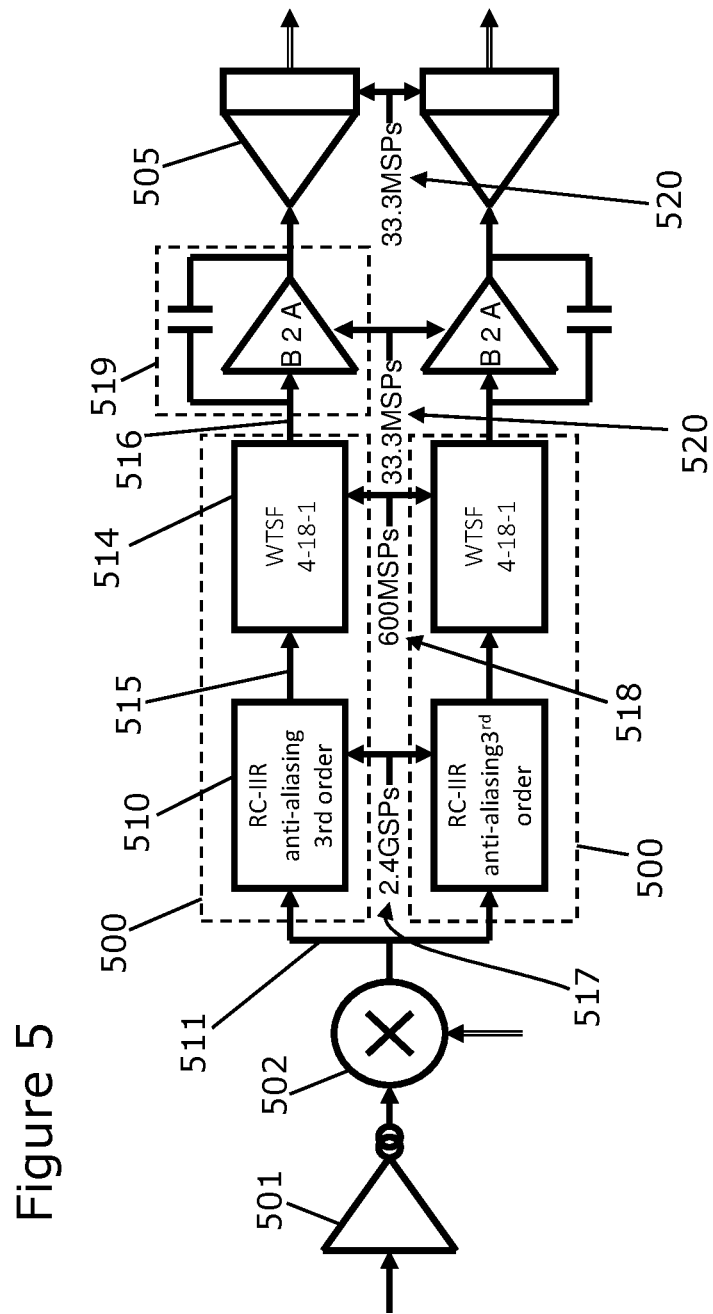
FIG. 5 shows a block diagram of a receiver that contains a switched capacitor RX baseband filter that includes two receiver circuits that are similar to that of FIG. 3.

FIG. 5 shows a block diagram of a switched capacitor RX baseband filter that includes two receiver circuits 500 that are similar to that of FIG. 3.

FIG. 5 shows a LNA 501, which receives an input signal from an antenna (not shown) and provide an output signal to a mixer 502. As is known in the art, the mixer 502 mixes the output signal from the LNA with a clock signal that is provided by a local oscillator (LO). In this example, the LO frequency is about 2.4 GHz.

The mixer 502 provides a mixer-output-signal 511, which is provided as an input signal to two identical receiver path circuits 500 that are in parallel with each other. The components of only one of the receiver path circuits 500 are labelled with reference numbers so as not to overload the drawing with reference numbers. One of the receiver path circuits 500 is used to process in-phase signals and the other receiver path circuit 500 is used to process quadrature signals.

In other examples, instead of having two separate receiver path circuits 500, a single receiver path circuit can be used to process the in-phase and quadrature signals. Such a receiver path can have two inputs and two output outputs, and can be referred to as a poly-phase filter or a "complex" filter.

The receiver path circuits 500 include a first stage 510, which in this example is implemented as a first switched-capacitor filter (resistor-capacitor infinite impulse response (RC-IIR)). The first stage 510 receives a down-sampler-clock-signal 517, in this example from the LO that provides the clock signal to the mixer 502, such that switches of the first stage 510 are operated at the LO rate (~2.4 GHz in this example). Further details of an example implementation of the first switched-capacitor filter of the first stage 510 are provided below with reference to FIG. 6. In this way, the first stage 510 can filter the mixer-output-signal 511 and also down-sample in order to provide a transition-signal 515 having a transition-frequency that is less than the frequency of the mixer-output-signal 511. In this example, the transition-frequency is LO/4 (in this example about 600 MHz).

The receiver path circuits 500 also include a second stage 514, which in this example is implemented as a $2^{nd}$ switched-capacitor filter (Weighted Tapped Sampling Filter (WTSF)). The second stage 514 receives a second-stage-clock-signal 518, which has a frequency that is a fraction of the LO rate (LO/4=600 MHz, in this example). In this way, switches of the second stage 514 are operated at the second-stage-clock-signal 518, which is also the transition-frequency. The output of the second stage 514 is a second-stage-output-signal 516, which has a frequency that is suitable for a downstream ADC 505. In this example, the frequency of the second-stage-output-signal 516 is 33.3 MHz, which is the same frequency as an ADC-clock-signal 520 that is used to clock the ADC 505. This is a relatively low frequency and therefore is good for reducing the power consumption of the ADC 505. Further details of an example implementation of the 2nd switched-capacitor filter (WTSF) of the second stage 514 are provided below with reference to FIG. 7.

Since the second stage 514 includes a switched-capacitor circuit, the second-stage-output-signal 516 that it provides as an output signal is in the charge domain. In this example, FIG. 5 also includes two Bank to ADC (B2A) stages 519; each one connected to the output terminal of one of the respective receiver path circuits 500. The Bank to ADC (B2A) stages 519 convert the charge output of the second stage filters to a voltage swing for a respective one of two ADCs 505. The architecture and implementation of the B2A stages 519 can be chosen based on the targeted ADC type and other specifics of an implementation.

Figure 6:
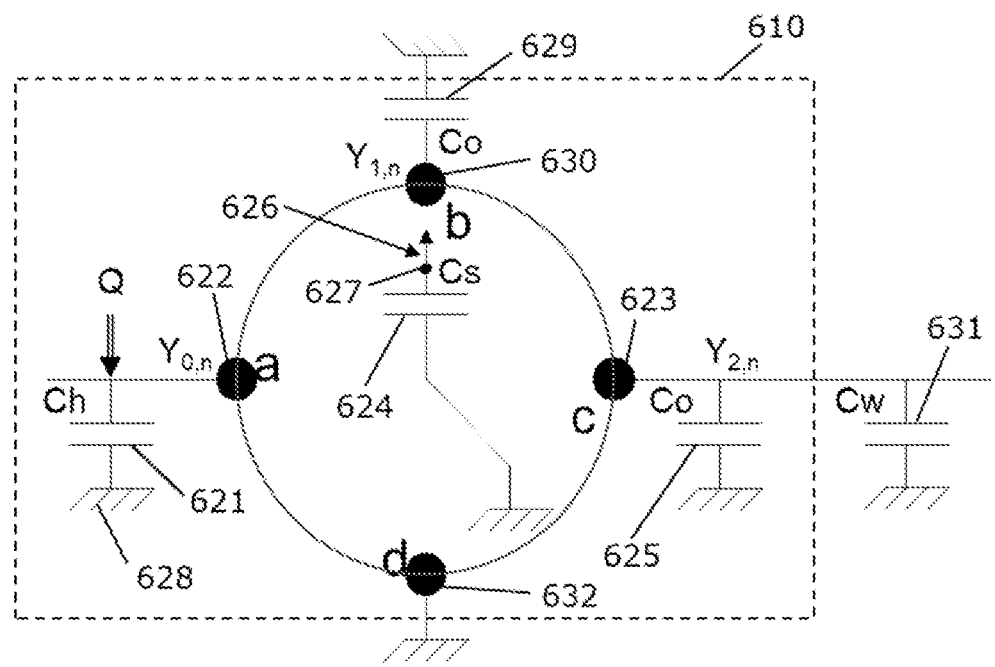
FIG. 6 shows an example embodiment of a first-stage down-sampling filter that can be provided as part of a first stage of any of the receiver circuits that are disclosed herein.
Figure 6:
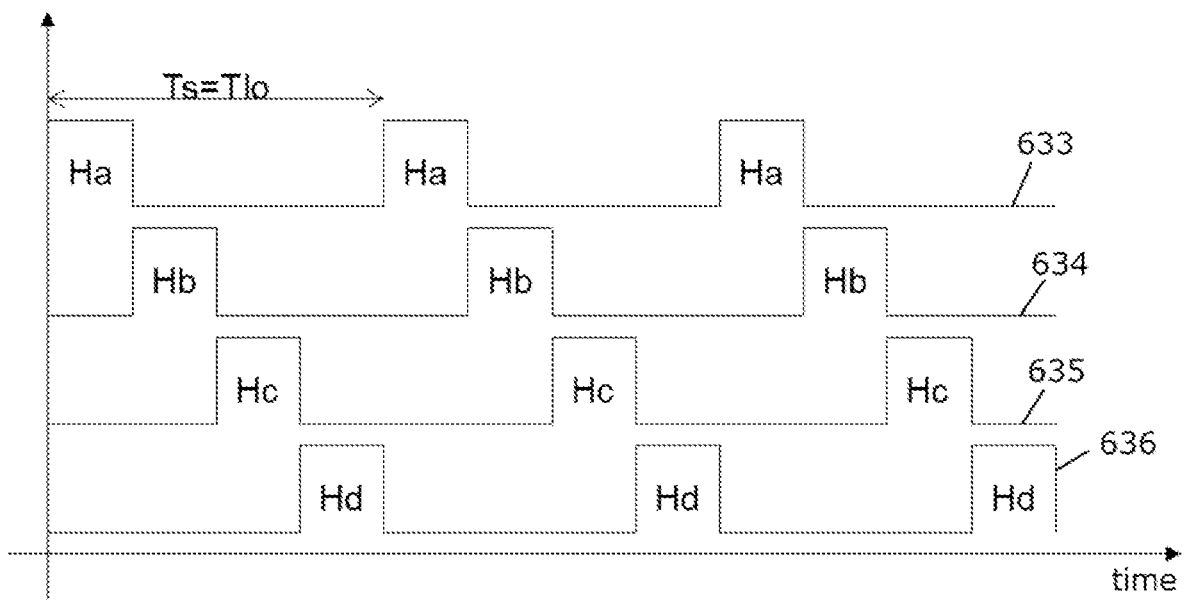

FIG. 6 shows an example embodiment of a first-stage down-sampling filter 610 that can be provided as part of a first stage of any of the receiver circuits that are disclosed herein. In this example the first-stage down-sampling filter comprises a first-stage switched capacitor circuit, which has a switched-capacitor based RxBB filter structure.

The upper portion of FIG. 6 shows a circuit diagram of the down-sampling filter 610. The lower portion of FIG. 6 shows a timing diagram for the down-sampling filter 610, and illustrates that there are four 25% duty cycle phases of the LO signal used for sampling an input-capacitor 621 (which can also be referred to as a history capacitor). That is, a complete sampling period (Ts) equals a period of the local oscillator (Tlo) that provides a clock signal to the mixer. Equivalently, a sampling frequency equals a local oscillator frequency.

The first-stage down-sampling filter 610 includes a first-stage-input-node 622, a first-stage-intermediate-node 630, a first-stage-output-node 623 and a first-stage-reset-node 632. The first-stage-input-node 622 receives a mixer-output-signal from a mixer, in the same way as described above. The first-stage-output-node 623 is for providing a transition-signal. As discussed above, the transition-signal has a transition-frequency, which is a lower frequency than that of the first-stage-output-signal.

The first-stage down-sampling filter 610 also includes a sampling-capacitor 624 (Cs), the input-capacitor 621 (Ch), an output-capacitor 625 (Co), an intermediate-capacitor 629 (Co); and a first-stage-switch 626 having a switch-node 627.

The input-capacitor 621 (Ch) is connected between the first-stage-input-node 622 and ground 628. The sampling-capacitor 624 (Cs) is connected between the switch-node 627 of the first-stage-switch 626 and ground 628. The intermediate-capacitor 629 (Co) is connected between the first-stage-intermediate-node 630 and ground 628. The output-capacitor 625 (Co) is connected between the first-stage-output-node 623 and ground 628. The first-stage-reset-node is connected to ground 628.

FIG. 6 also shows a capacitor 631 (Cw) that represents equivalent impedance of the second stage, and is connected between the first-stage-output-node 623 and ground 628.

The first-stage-switch 626 is operable to connect the switch-node 627 to each of the first-stage-input-node 622, the first-stage-intermediate-node 630, the first-stage-output-node 623 and the first-stage-reset-node 632 in turn. The timing diagram in the lower portion of FIG. 6 has four plots 633, 634, 635, 636:

- the first plot 633 represents a connection, by the switch 626, between the switch-node 627 and the first-stage-input-node 622 (this node is labelled as 'a' in FIG. 6). The first plot 633 has a high value (and therefore the switch-node 627 is connected to the first-stage-input-node 622) for a first quarter of a duty cycle of the sampling period.
- the second plot 634 represents a connection, by the switch 626, between the switch-node 627 and the first-stage-intermediate-node 630 (this node is labelled as 'b' in FIG. 6). The second plot 64 has a high value (and therefore the switch-node 627 is connected to the first-stage-intermediate-node 630) for a second quarter of the duty cycle of the sampling period.
- the third plot 635 represents a connection, by the switch 626, between the switch-node 627 and the first-stage-output-node 623 (this node is labelled as 'c' in FIG. 6). The third plot 635 has a high value (and therefore the switch-node 627 is connected to the first-stage-output-node 623) for a third quarter of the duty cycle of the sampling period.
- the fourth plot 636 represents a connection, by the switch 626, between the switch-node 627 and the first-stage-reset-node 632 (this node is labelled as 'd' in FIG. 6).

The fourth plot 636 has a high value (and therefore the switch-node 627 is connected to the first-stage-reset-node 632) for a fourth quarter of the duty cycle of the sampling period.

The first-stage down-sampling filter 610 is passive and therefore has relatively low power consumption; its power consumption comes primarily from routing the clocks. Also, the first-stage down-sampling filter 610 of this implementation does not require any high-rate clocks, except the LO phases that are already available from the mixer. The first-stage down-sampling filter 610 can be referred to as a rotating capacitor circuit, which provides good noise performance and can reduce any gain loss. The first-stage down-sampling filter 610 can be considered as a N-path filter whose clocks are the LO phase. The structure of the first-stage down-sampling filter 610 can beneficially preserve its gain and linearity even at much higher filtering orders. The gain can remain the same simply because no additional charge loss occurs in the system.

The first-stage down-sampling filter 610 is arranged as a third order filter in this example using the four LO phases that are available from a passive 25% duty cycle mixer. The dynamic range at the filter input (the first-stage-input-node 622) presents a compromise between the LNA/MIXER output linearity, and the noise of the switches that compose the filters. The filter chain gain is proportional to Gm/C as the noise of the filter is proportional to sqrt(1/C). So, the lower the capacitance C at the input of the first stage, the better the signal to noise ratio (SNR). Consequently, the higher the voltage swing, the higher are intermodulation products.

A front-end low noise amplifier and mixer (not shown in FIG. 6) provide charges to the input capacitor 621 (Ch) giving a first pole located close to zero. This is why in FIG. 6 and the following equation set, the input is represented by a charge Q. (Note that Yi in the following equations are voltages.) Charge sampling happens in the first position of the filter (when the switch-node 627 is connected to the first-stage-input-node 622). During this time, the current provided by the transimpedance of the LNA (TLNA) is integrated in time window (LO phases of interest) on the input capacitor 621 (Ch); it forms a continuous-time (CT) sinc-type antialiasing filter prior to sampling and filtering.

The rotating capacitor (sampling-capacitor 624 (Cs)) first resets by being connected to the first-stage-reset-node 632 (position d), and then connects to the first-stage-input-node 622 (position a), the first-stage-intermediate-node 630 (position b), a first-stage-output-node 623 (position d). In this example there are four positions as four LO phases are available. Each position (except the reset (d)) acts are a first order filter. Since there are three positions (excluding reset) that each provide the functionality of a first order filter, the filter order is three. In other examples, it can be possible to provide a different reset mechanism for discharging the sampling-capacitor 624 (Cs) such that a reset position is not required in the switching cycle for the rotating capacitor (sampling-capacitor 624 (Cs)) and therefore greater flexibility can be provided with setting the order of the first-stage down-sampling filter 610.

The set of equations that is labelled below 'Equations I' details the different phases steps over one LO period. In FIG. 6 there are four steps in each LO period. We assume a differential LNA and differential filter signalling, so charges arrive at two time slots $n+\frac{1}{4}$ & $n+\frac{3}{4}$. Time stamps (for the Z transform) n, n+1, n+2 represent the output rate of the filter (i.e. the LO rate). Cw represents the equivalent impedance of the second stage.

The complete transfer function is complex to express in closed-form, as the second stage disconnects Cw capacitor 631 and reconnects Cw capacitor 631 at a rate that is lower than the LO rate. The proposed structure comprises a sampled multi-rate linear time varying system. Nevertheless, the equations that correspond to the two configurations of the system, clearly show that there are three poles in the transfer function.

Equations I—describing the operation of the first stage filter when sampling input using multiple phases on the LO signal:

step (a)

$$(C_h+C_s)Y_{0,n+1/4}=C_h Y_{0,n}+C_s 0$$

$$Y_{1,n+1/4}=Y_{1,n}$$

$$(C_o+C_w)Y_{2,n+1/4}=C_o Y_{2,n}+C_w Y_{2,n}(\text{previous value}) \text{ or } C_w 0(\text{reset})$$

step (b)

$$C_h Y_{0,n+2/4}=C_h Y_{0,n+1/4}+Q_{n+1/4}$$

$$(C_o+C_s)Y_{1,n+2/4}=C_o Y_{1,n+1/4}+C_s Y_{0,n+1/4}$$

$$Y_{2,n+2/4}=Y_{2,n+1/4}$$

step (c)

$$Y_{0,n+3/4}=Y_{0,n+2/4}$$

$$Y_{1,n+3/4}=Y_{1,n+2/4}$$

$$(C_o+C_s+C_w)Y_{2,n+3/4}=(C_o+C_w)Y_{2,n+2/4}+C_s Y_{1,n+2/4}$$

step (d)

$$C_h Y_{0,n+1}=C_h Y_{0,n+3/4}+Q_{n+3/4}$$

$$Y_{1,n+1}=Y_{1,n+3/4}$$

$$Y_{2,n+1}=Y_{2,n+3/4}$$

Capacitor Cw connects and disconnect at a lower rate than the LO rate. For example, if the ratio between the LO and the clock rate of the WTSF is K, then Cw will remains connected to first filter for n=1 . . . K LO periods. Next round a new Cw (that has been reset) will replace the previous one, etc. So a round starts with Cw*0 (no charge as it is reset) and for the next (K−1) LO period it starts each period with Cw*Y2n charges.

Equations II—Composite transfer function of the first stage filter, showing the impact of resetting the sampling capacitor:

let's monitor @ time stamp $n + 1$(without reset) ...

$$(C_h + C_s)Y_{0,n+1} = C_h Y_{0,n} + (C_h + C_s)/C_h Q_{n+1/4} + (C_h + C_s)/C_h Q_{n+3/4}$$

$$(C_o + C_s)Y_{1,n+1} = C_o Y_{1,n} + C_h C_s/(C_h + C_s)Y_{0,n}$$

$$(C_o + C_s + C_w)Y_{2,n+1} = C_o Y_{2,n} + C_s Y_{1,n+1} + C_w Y_{2,n}$$

$$D_0 Y_0 = H_q Q \text{ with } D_0 = (C_h + C_s) - C_h z^{-1}, H_q = (C_h + C_s)/C_h$$

$$D_1 Y_1 = C_h C_s/(C_h + C_s)z^{-1} Y_0 \text{ with } D_1 = (C_o + C_s) - C_o z^{-1}$$

$$D_2^* Y_2 = C_s Y_1 \text{ with } D_{2b} = (C_o + C_s + C_w) - (C_o + C_w)z^{-1}$$

$$Y_2 = C_s^2 \frac{z^{-1}}{D_0 D_1 D_2^*} Q$$

$$Gq2v_{dc} = \frac{1}{C_s}, \frac{f_{3aB}}{f_s} \leftrightarrow \frac{C_s}{2\pi C_o}, \frac{C_s}{2\pi C_o}, \frac{C_s}{2\pi C_h}$$

-continued let's monitor @ time stamp $n + 1$(with reset) ...

$$(C_h + C_s)Y_{0,n+1} = C_h Y_{0,n} + (C_h + C_s)/C_h Q_{n+1/4} + (C_h + C_s)/C_h Q_{n+3/4}$$

$$(C_o + C_s)Y_{1,n+1} = C_o Y_{1,n} + C_h C_s/(C_h + C_s)Y_{0,n}$$

$$(C_o + C_s + C_w)Y_{2,n+1} = C_o Y_{2,n} + C_s Y_{1,n+1} + C_w Y_{2,n} \Rightarrow + C_w 0$$

$$D_0 Y_0 = H_q Q \text{ with } D_0 = (C_h + C_s) - C_h z^{-1}, H_q = (C_h + C_s)/C_h$$

$$D_1 Y_1 = C_h C_s/(C_h + C_s)z^{-1} Y_0 \text{ with } D_1 = (C_o + C_s) - C_o z^{-1}$$

$$D_2 Y_2 = C_s Y_1 \text{ with } D_2 = (C_o + C_s + C_w) - C_o z^{-1}$$

$$Y_2 = C_s^2 \frac{z^{-1}}{D_0 D_1 D_2} Q$$

$$Gq2v_{dc} = \frac{1}{(C_s + C_w)}, \frac{f_{3aB}}{f_s} \leftrightarrow \frac{C_s + C_w}{2\pi C_o}, \frac{C_s}{2\pi C_o}, \frac{C_s}{2\pi C_h}$$

These two sets of equations define a time varying system interface. Cw either remains connected (without reset case) or it disconnects, and a new reset capacitor connects (with reset case). Note that if Cs>>Cw, both transfer functions become similar.

Figure 7:
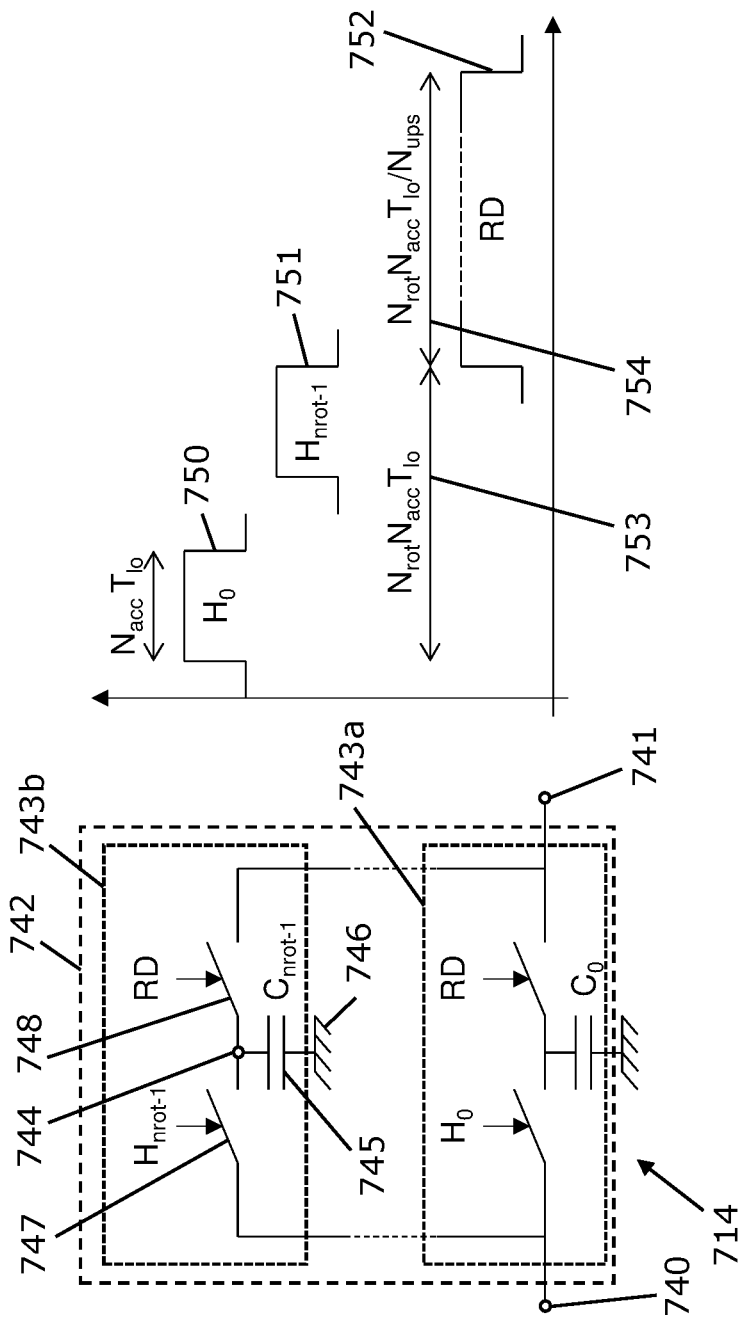
FIG. 7 shows an example embodiment of a second stage that can be provided as part of any of the receiver circuits that are disclosed herein.

FIG. 7 shows an example embodiment of a second stage 714 that can be provided as part of any of the receiver circuits that are disclosed herein. In this example the second stage comprises a switched-capacitor circuit that is implemented as a Weighted Tapped Sampling Filter (WTSF).

The left-hand portion of FIG. 7 shows a circuit diagram of the second stage 714. The right-hand portion of FIG. 7 shows a timing diagram for the second stage 714.

The second stage 714 includes a second-stage-input-node 740 and a second-stage-output-node 741. The second-stage-input-node 740 is for receiving the transition-signal. As discussed above, the transition-signal has a transition-frequency that is lower than the frequency of the first-stage-output-signal. The second-stage-output-node 741 is for providing the second-stage-output-signal. The second-stage-output-signal 216 a frequency that is suitable for the downstream ADC, and is lower than the transition-frequency.

The second stage 714 includes a bank of capacitors 742, which is connected between the second-stage-input-node 740 and a second-stage-output-node 741. In some examples, as will be discussed below, the second stage 714 may include a plurality of banks of capacitors 742 in parallel with each other between the second-stage-input-node 740 and a second-stage-output-node 741.

The bank of capacitors 742 comprises a plurality of branches 743, which are connected in parallel with each other between the second-stage-input-node 740 and the second-stage-output-node 741. Each branch 743 includes:
- a second-stage-intermediate-node 744;
- a second-stage-capacitor 745 connected between the second-stage-intermediate-node 744 and ground 746;
- a second-stage-holding-switch 747 connected between the second-stage-input-node 740 and the second-stage-intermediate-node 744; and
- a second-stage-discharge-switch 748 connected between the second-stage-intermediate-node 744 and the second-stage-output-node 741.

In FIG. 7 a first branch 743a and a last branch 743b are shown. Some components of the first branch 743a are labelled with a subscript '0'. Some components of the last branch 743b are labelled with a subscript 'nrot-1'. In this way, the number of branches 743 in the bank of capacitors 742 is 'nrot'. As will be appreciated from the description that follows, 'nrot' can be considered as the number of rotations in the bank of capacitors 742.

The second-stage-holding-switches 747 of each of the branches 743 are operable to selectively connect the second-stage-input-node 740 to a respective one of the second-stage-capacitors 745 sequentially in turn as part of a second stage sampling mode of operation. This is illustrated by the first two plots 750, 751 on the right-hand side of FIG. 7. The two plots that are shown here correspond to the two branches 743. It will be appreciated that for circuits with more than two branches 743 there will correspondingly be more than two plots for sampling the charge at the second-stage-input-node 740 on to a respective second-stage-capacitor 745.

The first plot 750 represents a connection, by the second-stage-holding-switch 747 of the first branch 743a, between the second-stage-input-node 740 and the second-stage-intermediate-node 744 of the first branch 743a. The first plot 750 has a high value (and therefore the second-stage-input-node 740 is connected to the second-stage-intermediate-node 744 of the first branch 743a) for a first portion of a sampling period of time 753. As shown in FIG. 7, the duration of this first portion is Nacc*Tlo, where: Nacc is the number of LO periods for which the capacitor stays connected to the output of the first stage; and Tlo is the period of the local oscillator. While the second-stage-holding-switch 747 of the first branch 743a is closed, the charge at the second-stage-input-node 740 is stored on the second-stage-capacitor 745 of the first branch 743a. When the second-stage-holding-switch 747 of the first branch 743a is closed, the second-stage-holding-switch 747 of the other branches 743 is closed (in this example the only other branch that is shown in the first branch 743a).

When the second-stage-holding-switch 747 of the first branch 743a is opened (and the value of the first plot 750 returns to zero), the second-stage-holding-switch 747 of another of the branches is immediately closed. (Although there is a gap between the second-stage-holding-switch 747 of the first branch 743a being opened in the first plot 750 and the second-stage-holding-switch 747 of the second branch 743b being closed in FIG. 7, this is schematic to indicate that second-stage-holding-switches 747 of one or more additional branches 743 could be operated in the intervening period.)

The second plot 751 represents a connection, by the second-stage-holding-switch 747 of the last branch 743b, between the second-stage-input-node 740 and the second-stage-intermediate-node 744 of the last branch 743b. The second plot 751 has a high value (and therefore the second-stage-input-node 740 is connected to the second-stage-intermediate-node 744 of the last branch 743b) for a last portion of the sampling period of time 753. The duration of the last portion of the sampling period of time 753 is the same as that of the first portion; i.e. Nacc*Tlo.

The total duration of the sampling period of time 753 is shown in FIG. 7 as Nrot*Nacc*Tlo, where: Nrot is the number of branches 743 in the bank of capacitors 742; Nacc is the number of LO periods for which the capacitor stays connected to the output of the first stage; and Tlo is the period of the local oscillator.

The second-stage-discharge-switches 748 of each of the branches 743 are operable to selectively connect the second-stage-capacitors 745 of each of the branches 743 to the second-stage-output-node 741 at the same time as part of a second stage discharging mode of operation. The third plot 752 in FIG. 7 represents a connection, by the second-stage-discharge-switches 748 of each of the branches 743, between the associated second-stage-intermediate-nodes 744 and the second-stage-output-node 741. In this way, all of the second-stage-discharge-switches 748 are operated together to discharge the second-stage-capacitors 745 of each of the branches 743 at the same time. The second-stage-discharge-switches 748 are closed for a discharge period of time 754, which has a duration of Nrot*Nacc*Tlo/Nups, where: Nrot*Nacc*Tlo corresponds to the sampling period of time 753 (as discussed above), and Nups represents the number of banks of capacitors 742 that should be interleaved in order to match the output data rate with the input data rate. In this example, where only one bank of capacitors 742 is shown, Nups equals 1 and therefore the discharge period of time 754 is the same as the sampling period of time 753. Also, Nups defines the number of periods available to transfer charges and rest capacitors before re-using the bank for a new round. If this time would have been zero (immediate reset/transfer) then Nbnk=(Mrot*Nacc)/Nups. Otherwise, if an Nups period is provided for the transfer/reset operation then Nbnk=(Nort*Nacc)/Nups+1; that is the number of physical banks. In the below equation we assume that the transfer/reset are immediate.

As shown in the timing diagram in FIG. 7, the second-stage-holding-switches 747 and the second-stage-discharge-switches 748 are operated to perform the second stage discharging mode of operation (as represented by the discharge period of time 754) and the second stage sampling mode of operation (as represented by the sampling period of time 753) sequentially in turn.

In this way, the second stage 714 can be composed of Nbnk interleaved banks composed of Nrot capacitors 745. Each capacitor 745 of each bank connects for Nacc LO periods to the first stage. After Nrot*Nacc LO periods all capacitors 745 are charged. Total charge resulting of the sum of Nrot capacitors 745 are transferred to a next gain stage and the capacitors are reset in preparation for a next round.

The throughput rate for the second stage 714 is the ADC sampling rate. the input rate is at the LO rate, so the following rule applies: Nrot*Nacc/Nbnk=Flo/Fadc. As, the charge transfer is not instantaneous, the corrected equation is Nrot*Nacc/(Nbnk−1)=Flo/Fadc, with the time for transfer of changes to be 1/Fadc.

The filter transfer function periodicity is (Flo/Nacc)*(Nbnk−1); it presents either notches or in-band rejection at (Flo/Nacc)/Nrot and sampling bumps every (Flo/Nacc)*(Nbnk−1). A purpose of the filtering in the first stage can be to provide low-pass filtering that lowers these replica bumps, especially close-in to the signal of interest to provide the anti-aliasing that is desired to meet the challenging selectivity requirements for the receiver line-up.

Note that the numbers of notches created as described must be kept low (a notch at all Fadc multiple can be particularly advantageous in some applications) in order to keep the notches wide enough to filter all frequency regions that can potentially alias in band.

Also, note that it is the combination of the filtering in both the first stage and the second stage that provides good anti-aliasing properties of the RX baseband, while decimating the switched capacitor output in the sampling domain.

Equations III—depicting the second stage transfer function and the anti-aliasing notches:

$N_{acc}$ number of $Tlo$ periods $C_{rot}$ connects to input $N_{rot}$ number of $C_{rot}$ per bank -continued $N_{bnk}$ number of interleaved banks $W_i$ weigth of the rotating capacitor (*FIR* filter *coeff*)(default value = 1.0)

The system behaves as a *FIR* filter clocked at $F_{lo}$ whose output is resampled at $f_{lo} \dfrac{N_{bnk}}{N_{rot} N_{acc}}$ $$H(z) = \sum_{i=0}^{N_{rot}} W_i z^{-N_{acc} i}, \quad H_d(e^{j\omega}) = \dfrac{1}{N_{bnk}} \sum_{k=0}^{N_{bnk}-1} H\left(e^{j(\omega - 2\pi k)/N_{bnk}}\right)$$

$$H(f) = \dfrac{\sin(\pi N_{rot} N_{acc} T_{lo} f)}{\sin(\pi N_{acc} T_{lo} f)} \text{ assuming } W_i = 1$$

$$H_d(f) == \dfrac{1}{N_{bnk}} \sum_{k=0}^{N_{bnk}-1} \dfrac{\sin\left(\pi N_{rot} N_{acc} T_{lo}\left(f - k f_{lo} \dfrac{N_{bnk}}{N_{rot} N_{acc}}\right)\right)}{\sin\left(\pi N_{acc} T_{lo}\left(f - k f_{lo} \dfrac{N_{bnk}}{N_{rot} N_{acc}}\right)\right)}$$

Figure 8:
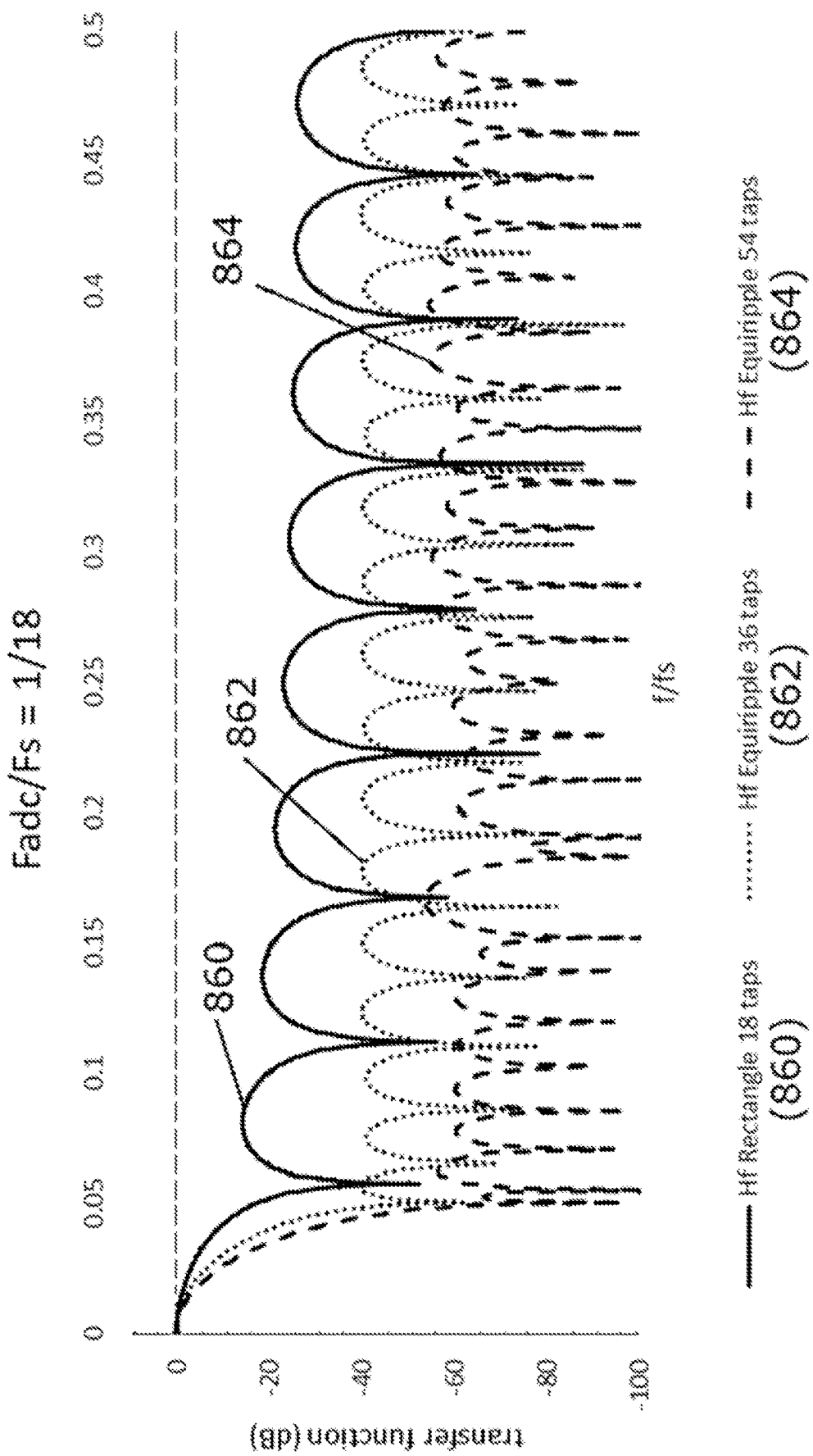
FIG. 8 shows frequency responses of a WTSF filter.

FIG. 8 shows frequency responses of the WTSF filter using example rectangle (18-taps) and equi-ripple windows of size 36 & 54 taps The second stage can also be built as a low-pass filter that would reject in-band signal aliasing. As an example, FIG. 8 depicts three configurations; for this purpose we assume that Fs=576 MHz, Fadc=576 MHz/18=32 MHz, and that BW=8 MHz centered at DC.

First configuration (shown with reference 860 in FIG. 8) is an integrator over 18 taps (a rectangular shape as all coefficients equal 1); it provides wide notches every K*Fadc.

Second configuration (shown with reference 862 in FIG. 8) is an equi-ripple low pass filter composed of 36 taps. It has been adjusted to provide enough anti-aliasing filtering at K*(Fadc+/−BW/2).

Third configuration (shown with reference 864 in FIG. 8) is an equi-ripple low pass filter composed of 54 taps. It has been adjusted to provide additional anti-aliasing filtering at K*(Fadc+/−BW/2). The higher the number of taps, the better is the anti-aliasing.

Note that the filters-coefficients for the second and third configurations 862, 864 are not equally weighted over filter taps (i.e., no rectangular shape); their coefficients (the second-stage-capacitors 745 that are used in the filter banks) have been computed, in this example, with an accuracy of 1/512 (or 9-bits quantization). Furthermore, in case the second-stage-capacitors 745 are much smaller in comparison with the output capacitor of the first stage, then there is no need to present fixed load (i.e. sum of all capacitor of all banks that connect at first stage output at each time stamp do not need to be constant over taps). This feature can avoid a need to add an extra "dummy" bank in the layout.

Figure 9:
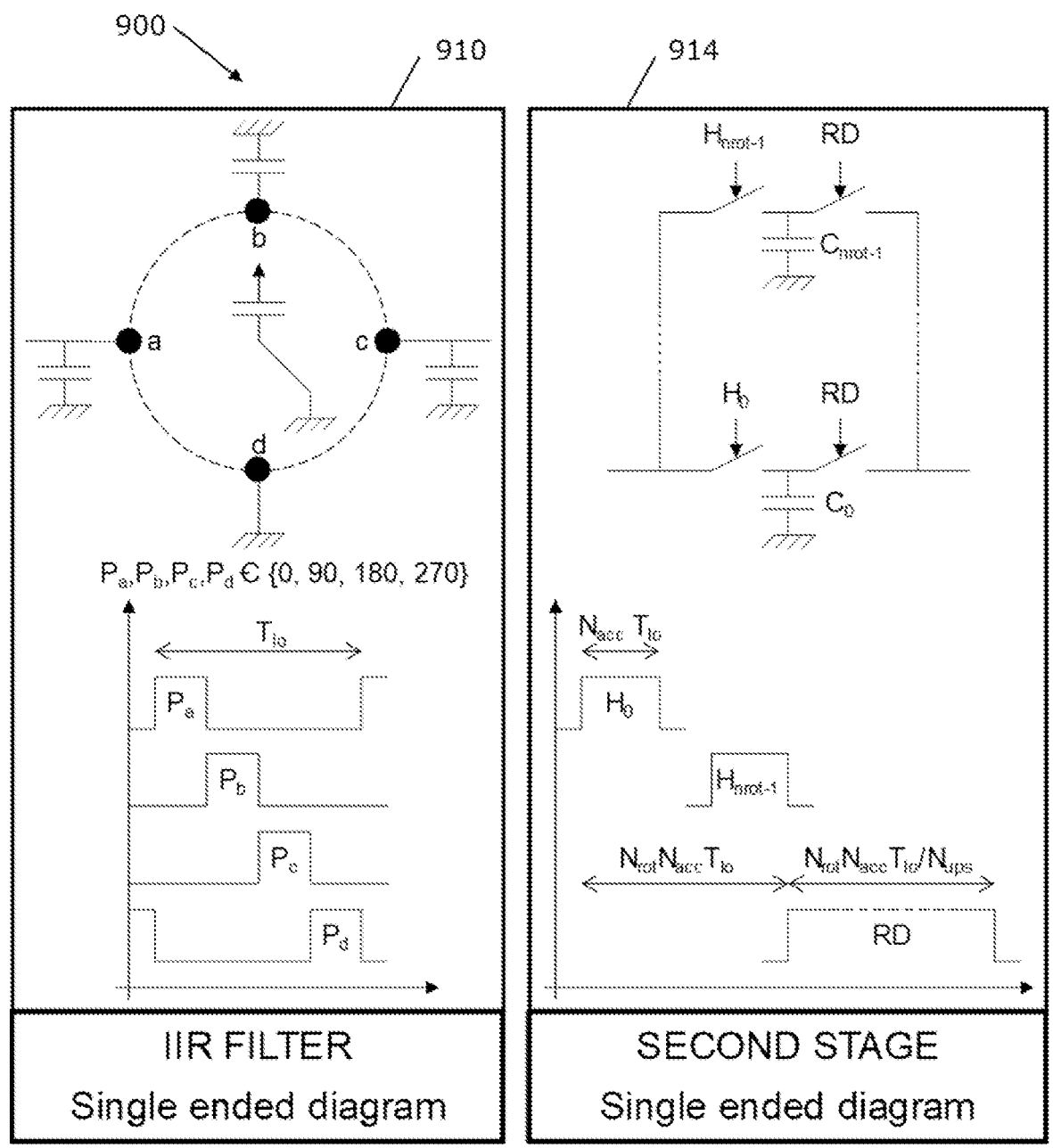
FIG. 9 shows a block diagram of a receiver circuit that illustrates how a single-ended first stage (the rotating capacitor 3rd order IIR filter of FIG. 6) and a single-ended second stage (the switched capacitor weighted accumulation filters of FIG. 7) are provided together.

FIG. 9 shows a block diagram of a receiver circuit 900 that illustrates how a single-ended first stage 910 (the rotating capacitor $3^{rd}$ order IIR filter of FIG. 6) and a single-ended second stage 914 (the switched capacitor weighted accumulation filters of FIG. 7) are provided together to constitute a complete receiver baseband stage.

In order to provide improved anti-aliasing, the receiver circuit 900 of FIG. 9 combines two passive switched capacitor filter stages:
the filter in the first stage 910 that provides filtering at a high rate right after down-mixing, and
the filter in the second stage 914 that provides either extra wide in-band notches or extra in-band rejection at all multiples of the ADC clock rate.

In combination, these filters advantageously significantly enhance the anti-aliasing properties that are needed for low-power yet high-performance applications, such as IoT.

Figure 10:
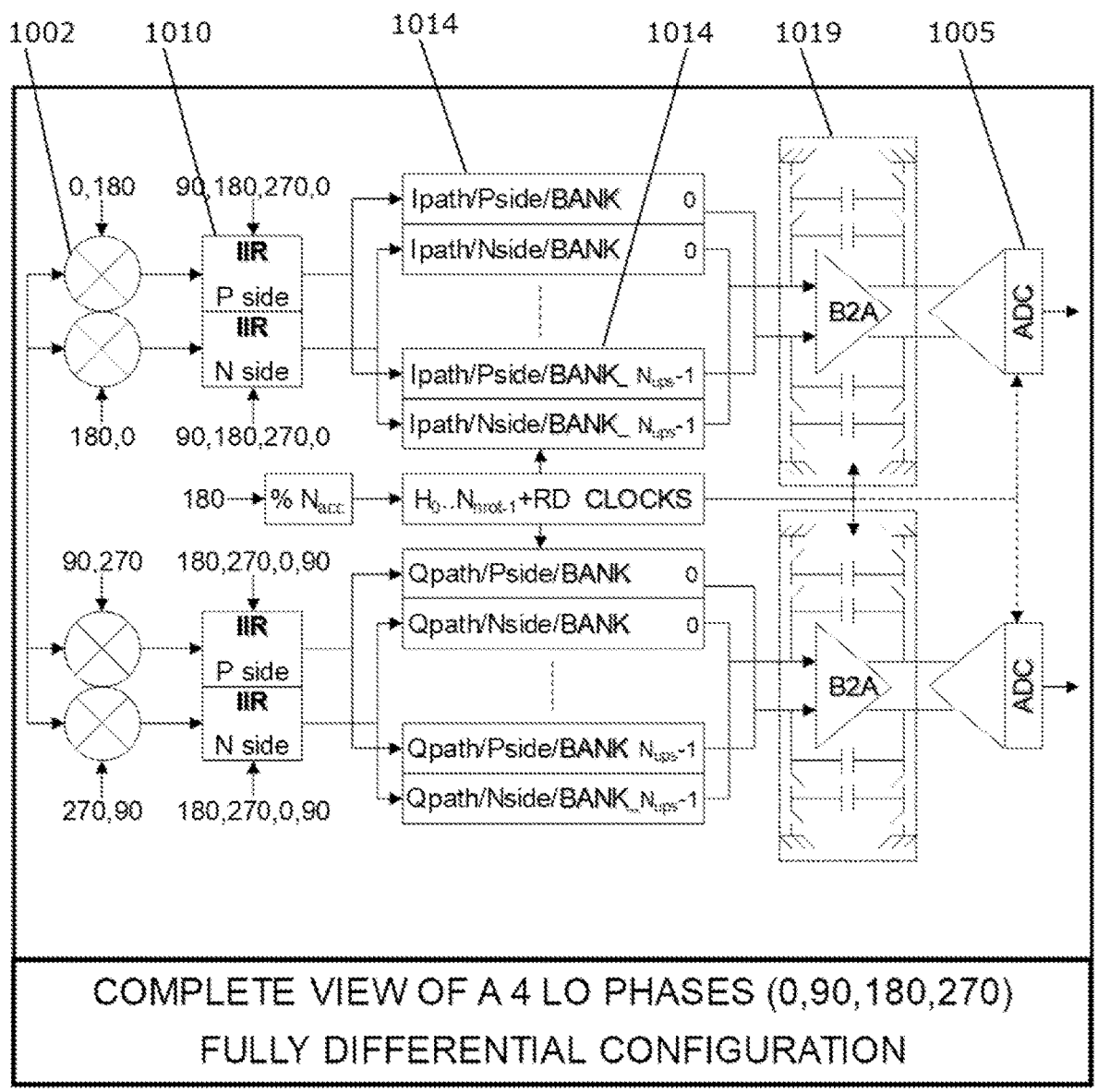
FIG. 10 shows a block diagram description of an assembly of a fully differential structure of a composite baseband filter according to an embodiment of the present disclosure.

FIG. 10 shows a block diagram description of an assembly of a fully differential structure of a composite baseband filter according to an embodiment of the present disclosure. The structure of FIG. 10 includes in-phase and quadrature processing paths (I and Q), each of which includes two complementary processing paths (N and P). Each of these 4 processing paths includes a mixer 1002, a first stage 1010, a second stage 1014 that includes two banks of capacitors in parallel with each other (BANK and BANK_$N_{ups}$−1), a B2A stage 1019 and an ADC 1005. Each of these components has been described in detail above, for instance with reference to FIG. 5. FIG. 10 shows how 4 phases (0°, 90°, 180°, 270°) of a LO can be provided as clock signals for the mixers 1002 and the first stage 101. Furthermore, the clock signals for the second stages 1014, the B2A stages 1019 and the ADCs 1005 can be derived from the LO clock signals.

If the ADCs 1005 are a Nyquist type, the B2A (Bank to ADC) stages 1019 adapt the dynamic of filter output to the ADC full scale. They can also perform extra filtering. If the ADCs 1005 are a DELTA-SIGMA type, then the B2A stages 1019 can be skipped and the charges stored in the filter banks of the second stage 1014 are read, directly transfer to the first integrator feedback capacitance.

In some examples DC offset compensation (DCOC) can be placed either in front of the input to the first stage 101, at the inputs to the second stage 1014, or at the input to the B2A stages 1019.

Examples described herein can use a passive switched-capacitor based implementation and low-rate data converter for low power operation. Thanks to switched-capacitor techniques, the transfer function can depend only on capacitor ratio; which is relatively well controlled over process and generally presents negligible temperature deviation. Also, it is easier to layout circuit structures that are robust against mismatches. This can be considered better than switched-capacitor techniques such as Multi-Tap Direct Sampling Mixer (MTDSM) that can suffer from poor anti-aliasing and require a high-rate data converter that consumes higher power.

Figure 11A:
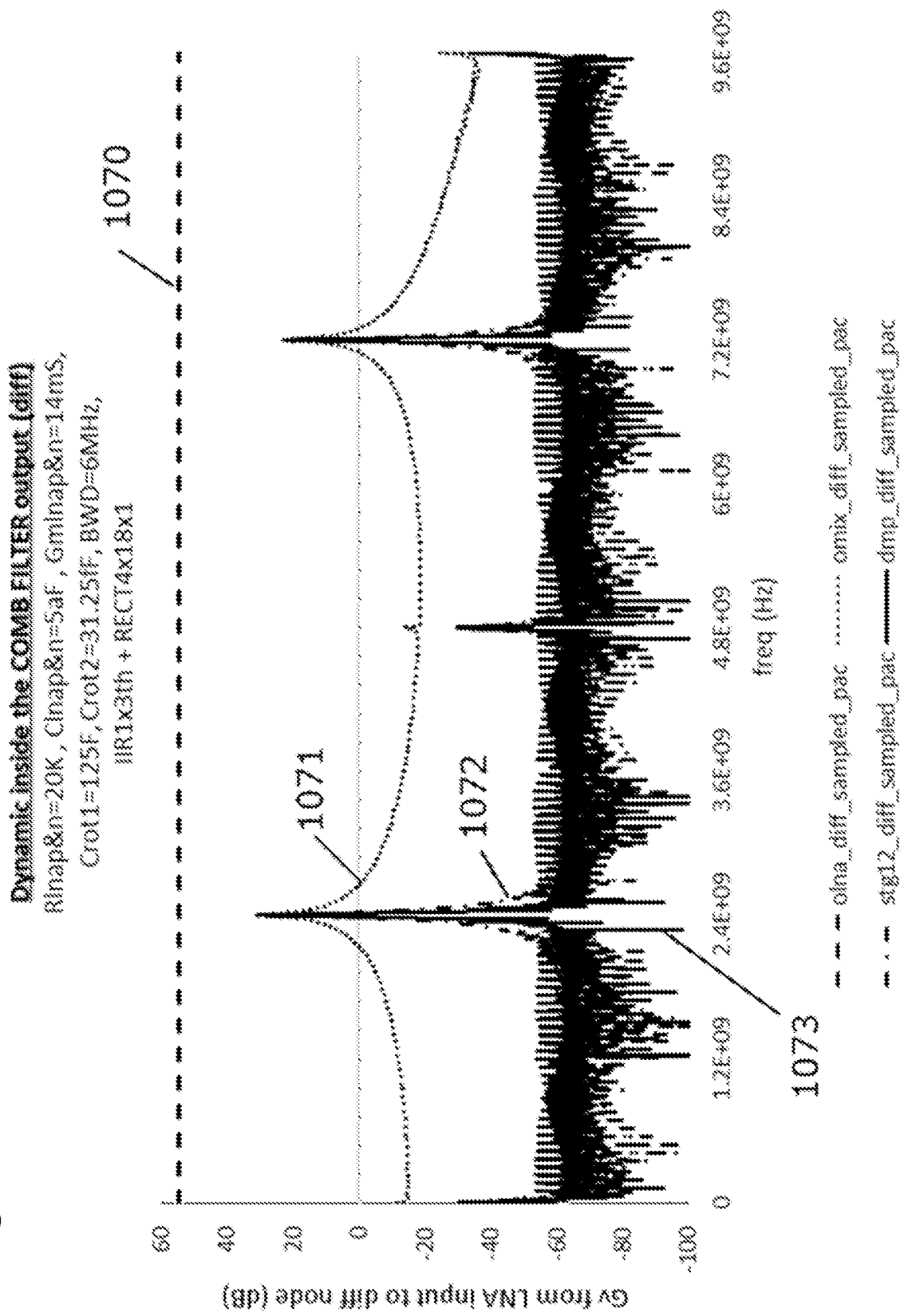
FIGS. 11A and 11B show the frequency domain characteristics of the transfer function of the receiver circuit of FIG. 5 using a rectangular window.
Figure 11B:
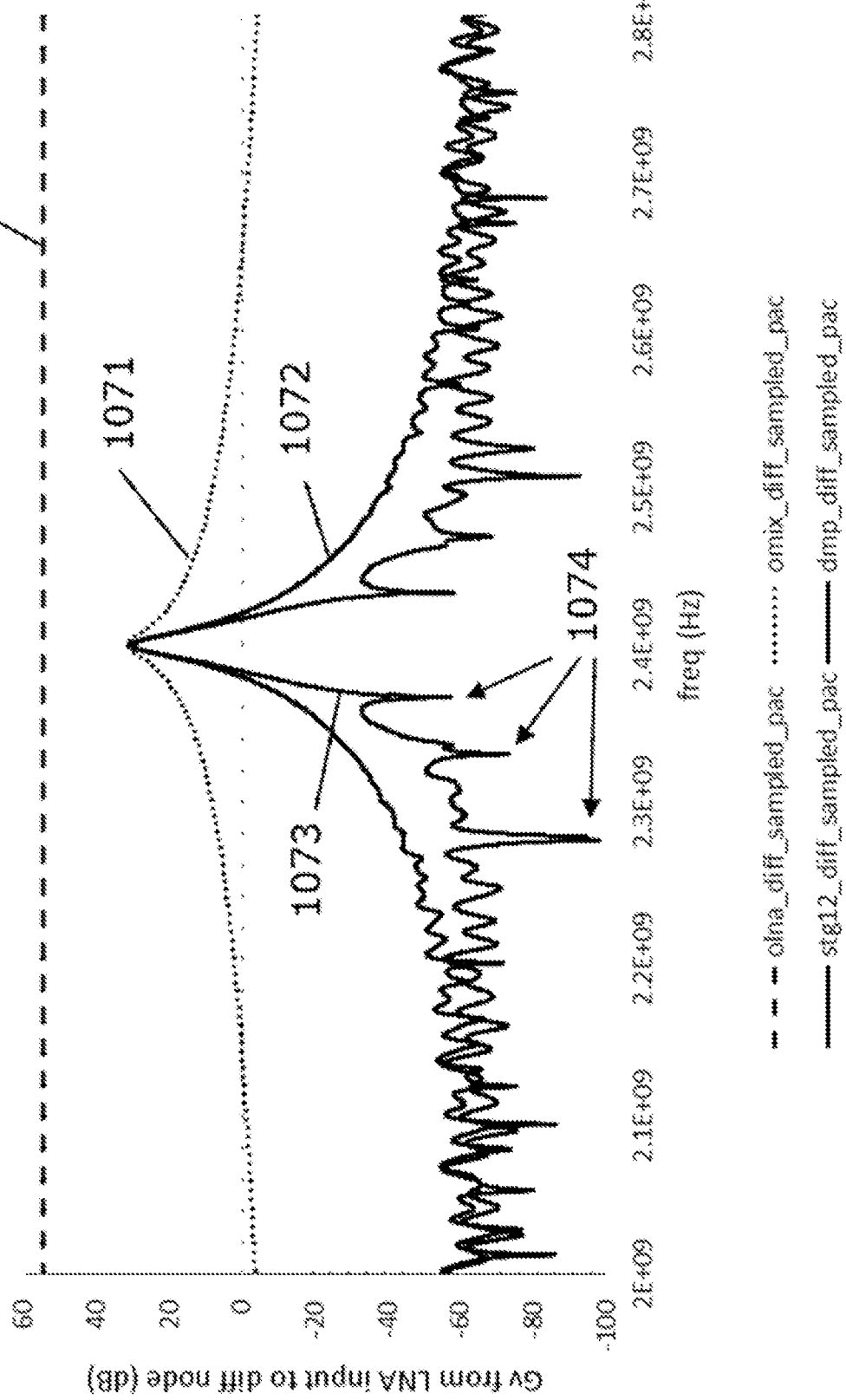

FIGS. 11A and 11B show the frequency domain characteristics of the transfer function of the receiver path circuit 500 (combined filter1+filter 2) of FIG. 5 using a rectangular window. FIG. 11B is a zoomed-in view of FIG. 11A that is focussed on the signal of interest at 2.4 GHz.

The following plots are shown in FIGS. 11A and 11B:
1070—the output of the LNA 501 in FIG. 5;
1071—the output of the mixer 502 in FIG. 5 (i.e. the mixer-output-signal 511);
1072—the output of the first stage 510 in FIG. 5 (i.e. the transition-signal 515); and
1073—the output of the second stage 514 in FIG. 5 (i.e. the second-stage-output-signal 516).

Advantageously, the second-stage-output-signal (represented by plot 1073) shows three good notches 1074 at multiples of the ADC clock frequency either side of the frequency of interest (at 2.4 GHz).

FIGS. 11A and 11B depict transfer gain from LNA input to LNA output (plot 1070), MIXER output (plot 1071), INTER STAGE (plot 1072) and FILTER output (plot 1073). Note that the level at FILTER output (plot 1073) is measured prior to charge dump at a subsequent gain stage.

The MIXER output (plot 1071) shows a first order behavior. The INTER STAGE (plot 1072) shows the higher order (3 in this particular case) filtering effect. The INTER STAGE (plot 1072) also depicts the time varying effect as some bumps disturb the "smoothed" curve.

The FILTER output (plot 1073) clearly shows the benefit of the second stage, which has a transfer function that presents extra smooth filtering and zeros at all multiple of ADC clock frequency (Flo/(Nacc*Nrot)).

Figure 12:
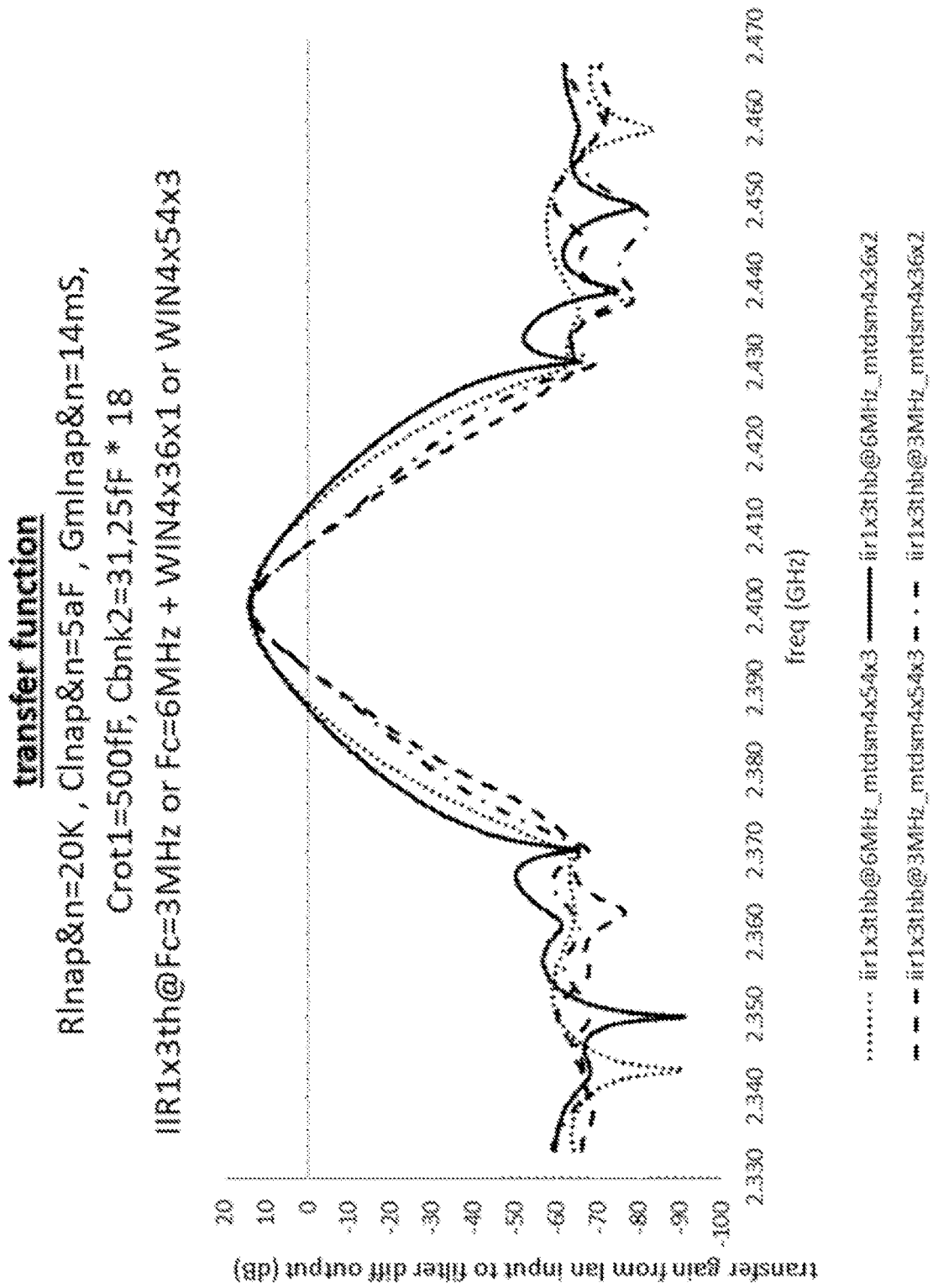
FIG. 12 shows the combined frequency domain transfer function of the receiver circuit of FIG. 5 using weighted capacitor banks in the second stage filter.

FIG. 12 shows the combined frequency domain transfer function of the receiver path circuit 500 of FIG. 5 using weighted capacitor banks in the second stage filter.

The zoomed-in frequency domain characteristics of FIG. 12 show a comparison of the combined filter transfer function when various weighted capacitor coefficients are implemented in the second stage filter, as identified in the figure.

One or more of the examples described herein relate to a switched capacitor-based receiver baseband that avoids the following shortcomings of prior art switched capacitor based direct sampling mixers:

High sampling rate ADC.

Degraded selectivity due to inadequate close-in filtering.

Poor anti-aliasing as only the first order filtering and notch combination happens. Note that the location and the width of sampling notches depends on the frequency of the switched capacitor bank clock. A higher speed clocking of the filter results in transfer function notches that occur at a higher offset and also results in the notches having a wider width. However, these notches in combination with just first order filtering (Ch in continuous domain as we also benefit) provide inadequate anti-aliasing in the baseband stage.

One or more of the switched capacitor-based receiver basebands described herein can have the following attributes:

Combination of higher order filtering at LO rate+extra notches from a second stage operating at the fractional LO rate;

Higher selectivity in analog domain;

Low-rate ADC requirement, resulting in low-power consumption;

Taking benefit of the available equivalent higher clock (the LO phases) that are required for a 25% LO mixer.

Applications of one or more of the circuits described herein include:

Narrowband receivers used for<5 MHz receive in 2.4 GHz, cellular and Sub-GHz bands for a variety of standards, such as Bluetooth, IEEE 802.15.4 implementations, Lora, SigFox, WMBUS, etc.;

IoT products; and

Key Cards, or location tags or keyfobs, etc. (i.e., applications built around localization).

It will appreciated that various circuit/implementation level variations of the proposed two stage filtering can be used, whilst still achieving the desired functionality. These include the following, non-limiting, examples:

circuit or filter topology, real vs complex and/or higher order filtering, current mode vs voltage mode operation, switched capacitance realizations, and single-ended vs differential.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimes is:

1. A receiver path circuit comprising:
a first-stage down-sampling filter that is configured to provide the functionality of:
a first stage configured to:
filter a mixer-output-signal received from a mixer; and
provide a first-stage-output-signal; and
a down-sampler configured to:
down-sample the first-stage-output-signal to provide a transition-signal having a transition-frequency, wherein the transition-frequency is a lower than the frequency of the first-stage-output-signal; and a second stage, which comprises a switched-capacitor circuit that is configured to:
    filter and reduce the frequency of the transition-signal in order to provide a second-stage-output-signal to an ADC,
wherein the first-stage down-sampling filter comprises:
    a first-stage-input-node for receiving the mixer-output-signal;
    a first-stage-intermediate-node;
    a first-stage-output-node for providing the transition-signal;
    a sampling-capacitor;
    an input-capacitor;
    an output-capacitor;
    an intermediate-capacitor; and
    a first-stage-switch having a switch-node;
wherein:
    the input-capacitor is connected between the first-stage-input-node and ground;
    the sampling-capacitor is connected between the switch-node of the first-stage-switch and ground;
    the intermediate-capacitor is connected between the first-stage-intermediate-node and ground;
    the output-capacitor is connected between the first-stage-output-node and ground; and
    the first-stage-switch is operable to connect the switch-node to each of the first-stage-input-node, the first-stage-intermediate-node and the first-stage-output-node in turn, over a sampling period.

2. The receiver path circuit of claim 1, wherein the first stage comprises a passive filter.

3. The receiver path circuit of claim 1, wherein the first-stage down-sampling filter comprises a first-stage switched capacitor circuit.

4. The receiver path circuit of claim 3, wherein the first-stage down-sampling filter is clocked by a signal from a local oscillator that is also used by the mixer.

5. The receiver path circuit of claim 3, wherein the first-stage switched capacitor circuit comprises a rotating capacitor IIR filter.

6. The receiver path circuit of claim 1, wherein the switched-capacitor circuit of the second stage comprises a weighted tapped sampling filter.

7. The receiver path circuit of claim 1, wherein the switched-capacitor circuit of the second stage is configured to be clocked at the transition-frequency.

8. The receiver path circuit of claim 1, wherein the sampling period corresponds to a period of a local oscillator that provides a clock signal to the mixer.

9. The receiver path circuit of claim 1, further comprising a first-stage-reset-node that is connected to ground, and wherein:
    the first-stage-switch is operable to connect the switch-node to each of the first-stage-input-node, the first-stage-intermediate-node, the first-stage-reset-node and the first-stage-output-node in turn, over the sampling period.

10. A receiver path circuit comprising:
a first stage configured to:
    filter a mixer-output-signal received from a mixer; and
    provide a first-stage-output-signal;
a down-sampler configured to:
    down-sample the first-stage-output-signal to provide a transition-signal having a transition-frequency,
    wherein the transition-frequency is a lower than the frequency of the first-stage-output-signal; and
a second stage, which comprises a switched-capacitor circuit that is configured to:
    filter and reduce the frequency of the transition-signal in order to provide a second-stage-output-signal to an ADC,
wherein the second stage comprises:
    a second-stage-input-node for receiving the transition-signal;
    a second-stage-output-node for providing the second-stage-output-signal;
    one or more banks of capacitors, wherein each bank of capacitors comprises a plurality of branches that are connected in parallel with each other between the second-stage-input-node and the second-stage-output-node;
wherein:
each branch comprises:
    a second-stage-intermediate-node;
    a second-stage-capacitor connected between the second-stage-intermediate-node and ground;
    a second-stage-holding-switch connected between the second-stage-input-node and the second-stage-intermediate-node; and
    a second-stage-discharge-switch connected between the second-stage-intermediate-node and the second-stage-output-node;
    the second-stage-holding-switches of each of the branches are operable to selectively connect the second-stage-input-node to a respective one of the second-stage-capacitors sequentially in turn as part of a second stage sampling mode of operation;
    the second-stage-discharge-switches of each of the branches are operable to selectively connect the second-stage-capacitors of each of the branches to the second-stage-output-node at the same time as part of a second stage discharging mode of operation; and
    the second-stage-holding-switches and the second-stage-discharge-switches are operated to perform the second stage discharging mode of operation and the second stage sampling mode of operation sequentially in turn.

11. The receiver path circuit of claim 10, comprising a plurality of banks of capacitors in parallel with each other.

12. A composite baseband filter comprising in-phase and quadrature processing paths, each of which includes two complementary processing paths, wherein each processing path comprises a receiver path circuit as in claim 1.

13. The composite baseband filter of claim 12, wherein the first stage comprises a passive filter.

14. The composite baseband filter of claim 12, wherein the first-stage down-sampling filter comprises a first-stage switched capacitor circuit.

15. The composite baseband filter of claim 14, wherein the first- stage down-sampling filter is clocked by a signal from a local oscillator that is also used by the mixer.

16. The composite baseband filter of claim 14, wherein the first- stage switched capacitor circuit comprises a rotating capacitor IIR filter.

17. The composite baseband filter of claim 12, wherein the switched-capacitor circuit of the second stage comprises a weighted tapped sampling filter.

* * * * *